United States Patent [19]

Lange

[11] Patent Number: 5,289,072
[45] Date of Patent: Feb. 22, 1994

[54] ELECTRICAL MACHINE

[75] Inventor: Andreas Lange, Heidenheim, Fed. Rep. of Germany

[73] Assignee: J. M. Voith GmbH, Heidenheim, Fed. Rep. of Germany

[21] Appl. No.: 910,345

[22] PCT Filed: Oct. 15, 1991

[86] PCT No.: PCT/EP91/01955
§ 371 Date: Sep. 30, 1992
§ 102(e) Date: Sep. 30, 1992

[87] PCT Pub. No.: WO92/10023
PCT Pub. Date: Jun. 11, 1992

[30] Foreign Application Priority Data

Nov. 23, 1990 [DE] Fed. Rep. of Germany ....... 4037231

[51] Int. Cl.$^5$ .............................................. H02K 1/22
[52] U.S. Cl. ........................... 310/266; 310/45; 310/112; 310/156; 310/162; 310/179; 310/254
[58] Field of Search ............. 310/166, 156, 162, 163, 310/45, 112, 179, 254, 261, 216

[56] References Cited

U.S. PATENT DOCUMENTS

| | | | |
|---|---|---|---|
| 2,427,584 | 9/1947 | Welch | 172/278 |
| 4,433,260 | 2/1984 | Weisboard | 310/156 |
| 4,757,220 | 6/1988 | Pouillange | 310/266 |
| 4,758,756 | 7/1988 | Pouillange | 310/266 |
| 4,973,868 | 11/1990 | Wust | 310/266 |
| 5,051,641 | 9/1991 | Weh | 310/163 |

FOREIGN PATENT DOCUMENTS

| | | |
|---|---|---|
| 0356368 | 2/1990 | European Pat. Off. . |
| 3536538 | 4/1987 | Fed. Rep. of Germany ...... 310/266 |
| 3705089C2 | 2/1989 | Fed. Rep. of Germany . |

Primary Examiner—R. Skudy
Attorney, Agent, or Firm—Baker & Daniels

[57] ABSTRACT

A current rectifier-excited synchronous electrical machine includes a rotor defining an axis of rotation. The rotor includes a rotor shaft, a stator housing, and a central disk. The rotor shaft is mounted in the stator housing. The central disk extends radially outward from the rotor and defines an outer circumference. At least one ring-shaped pole structure is secured to the disk outer circumference and disposed coaxial to the axis of rotation. The pole structure includes a plurality of permanent magnets, soft iron elements and insulators. The permanent magnets and soft iron elements are disposed in interleaved fashion. The insulators are formed of magnetically and electrically nonconductive material and are disposed between each of the magnets and iron elements. The magnets, iron elements and insulators are disposed in two side-by-side rows. Each pole structure is opposed by a stator assembly comprising an outside stator and an inside stator. The outside stator is disposed radially outward of the pole structure, and the inside stator is disposed radially inward of the pole structure. The outside and inside stators are armature elements of a general U-shape defining a pair of ends disposed adjacent and facing the pole structure. A single armature winding operably excites the stator. The armature winding is disposed only in one of the outside stator and inside stator, and the other of the outside and inside stator is void of a winding.

5 Claims, 1 Drawing Sheet

ELECTRICAL MACHINE

BACKGROUND OF THE INVENTION

The invention concerns an electrical machine, specifically a rectifier-energized synchronous machine on the transversal flow principle. A machine designed according to this operating principle is known from DE-PS 37 05 089.

The so-called transversal flow concept is based on exciting the stator field not in the longitudinal direction of the machine—i.e., parallel to the axis of rotation of the rotor—but in peripheral direction, that is, along the direction of movement as the rotor rotates. To that end, the rotor has at least a pole structure of two side-by-side rows of permanent magnets alternately magnetized in peripheral direction and soft iron elements, the two rows being separated by an intermediate layer of magnetically and electrically nonconductive material. In principle, this pole structure is of drum shape.

The stator consists essentially of two parts, namely an outer stator arranged radially outside the pole structure and an inside stator arranged radially within the pole structure. Each stator part features soft iron armature elements which essentially are fashioned U-shaped and whose open shanks are opposed in magnets of the rotors, from radially inside or radially outside, across an air gap. The prior machine features for excitation, for each stator part, an annular winding extending in peripheral direction.

With this arrangement characterized by a simple winding structure and with a direction of magnetic flux extending transverse to the direction of movement, high power densities can be achieved, especially when selecting small pole pitches. The electrical lead to the two annular windings of the stator halves must be passed through the armature elements. For removal of the heat accuring in the windings there are as well only the spaces between the armature elements available. On the inside stator, however, the spaces between the armature elements are at identical pole number and smaller radius considerably smaller than on the outside stator. Thus, the space conditions are especially unfavorable for the inside stator, entailing problems in the feed line design, winding structure and assembly of the inside stator.

SUMMARY OF THE INVENTION

The problem underlying the invention consists in improving the winding structure and the excitation of an electrical machine of the initially named category to the effect that the line routing, heat removal and assembly will be facilitated.

This problem is solved in that the excitation of the stator is concentrated in a sole annular winding extending in peripheral direction and in that this sole annular winding is accommodated only in one of the two stator halves. The other stator half thus remains void of an annular winding and, thus, magnetically inactive. This stator half forms thus a magnetic back circuit between the two permanent magnet rows on the pole structure of the rotor. This measure entails a significant simplification of the winding structure on the motor and a considerably simplified assembly, in conjunction with elevated operational safety, specifically as regards the insulation resistance in view of the heat load to be expected.

In one embodiment of the invention, the sole annular winding is disposed in the outside stator, allowing the inside stator to remain void of a winding. The armature elements of the no-winding stator part may be fashioned as laminated back circuit elements, specifically as C-cores, and arranged in the peripheral direction at a spacing corresponding to twice the pole pitch on the pole structure of the rotor. The armature elements of the stator part accommodating the annular winding may be fashioned as well as C-cores which embrace the annular winding in U-shaped fashion on three sides. The rotor may feature two pole structures which are arranged symmetrically on both sides of the central plate, with the two pertaining stators having a structure such that the sole annular windings are always arranged in the same stator part, i.e., on the inside stator or preferably on the outside stator. This measure assures a quiet non-vibrating running of the motor.

BRIEF DESCRIPTION OF THE DRAWINGS

An embodiment of the invention will be described hereafter with the aid of the drawing, which shows in FIG. 1, a schematic longitudinal section through the electrical machine.

DETAILED DESCRIPTION OF THE INVENTION

Figure 1:
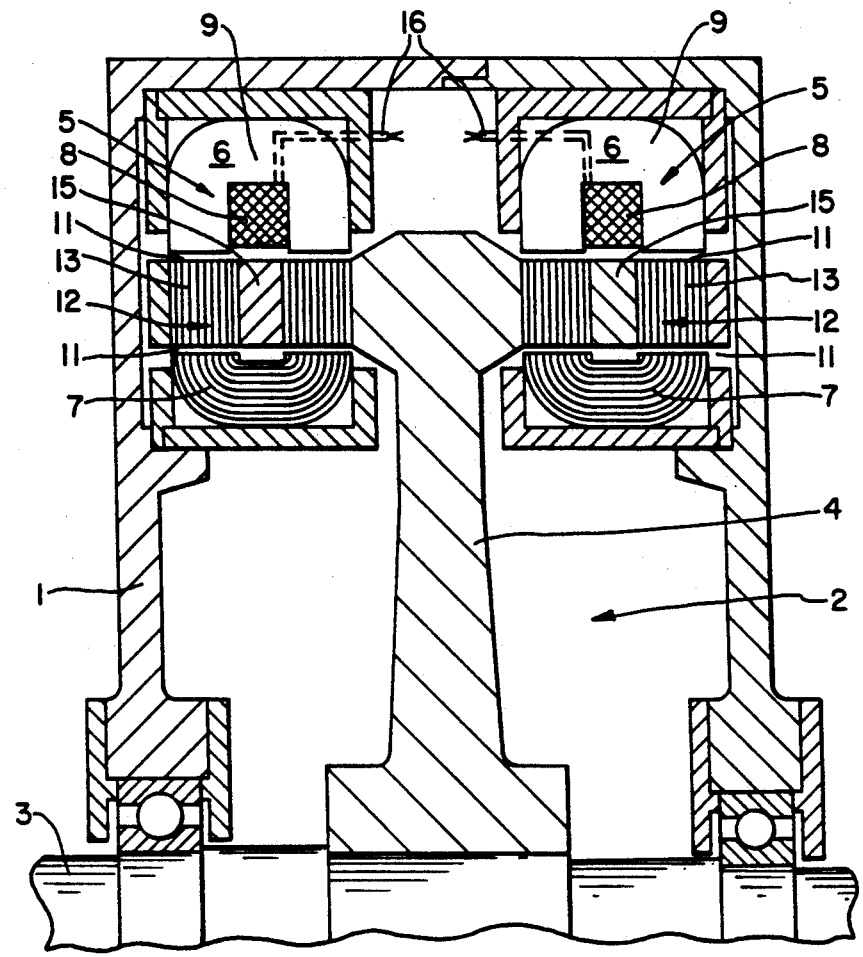

The machine illustrated schematically in section in FIG. 1 comprises a stator housing 1 in which a rotor 2 with its shaft 3 is rotatably mounted. The rotor consists of a central disk 4 on the radially outer area of which there are two pole structures 12 arranged, symmetrically toward both sides and coaxially to the axis of rotation of the shaft 3. These pole structures are comprised of permanent magnets 13 which in two rows, in peripheral direction and side by side, are alternately polarized and adjacent to soft iron elements 14, with all parts being separated from each other by electrically and magnetically nonconductive insulating layer 15 (FIG. 2), which is, preferably comprised of plastic. Embedded in plastic, the disk 4 forms with the pole structure 12, the magnets 13 and soft iron elements 14 (illustrated in FIG. 2) a rotary body reinforced in itself. Separated by an air gap 11, each of the pole structures 12 is opposed by a stator assembly 5 consisting of a radially outer outside stator 6 and a radially inner inside stator 7. Each outside stator 6 is comprised of a plurality of U-shaped armature elements 9 whose open shanks oppose the permanent magnet 13 of the pole structure 12 of the rotor. Contained within each outside stator 6 of each respective stator assembly 5 surrounded on three sides by each respective armature element 9 is an armature or annular winding 8 extending in peripheral direction. The inside stator 7 is void of an annular winding and merely forms the magnetic back circuit for stator excitation between the permanent magnets 13 on the radially inner side, namely in a radial plane (transversal flow principle).

Armature winding 8 is disposed only in one of the outside stator 6 and inside stator 7, the other of the outside stator 6 and inside stator 7 being void of armature winding 8.

Figure 2:
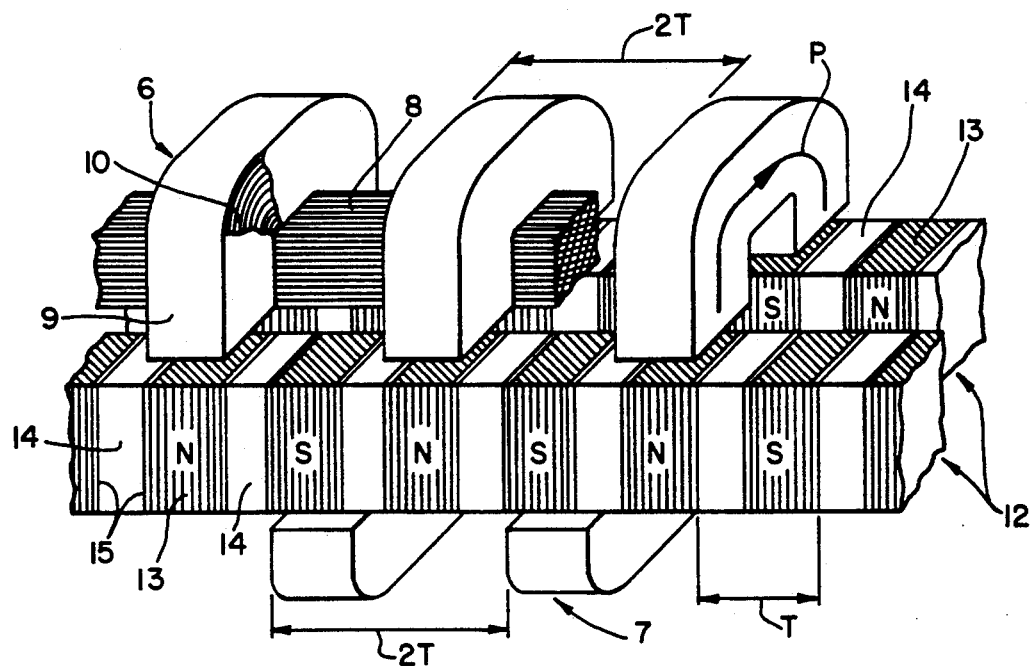
FIG. 2, a schematic view of the rotor pole structure and of the stator elements embracing them.

FIG. 2 shows schematically and in extended position a section of one pole structure 12 of the rotor and the surrounding stator parts 6, 7. Visible are the two rows of permanent magnets 13 and soft iron elements 14 which are arranged one behind the other and combined by a magnetically and electrically nonconductive insulating layer 15 in peripheral direction (FIG. 2). The permanent magnets 13 of the one row, as compared to those of the other row, are poled in different direction, creating a magnetic flux direction according to arrow P. The two rows of permanent magnets 13 with soft iron elements 14 are separated from each other also crosswise to their peripheral direction by magnetically and electrically nonconductive insulating layer 15 (FIG. 1), preferably plastic, but nonetheless connected with one another in load-bearing fashion.

Also evident is that the outside stator 6 features soft iron armature elements 9 which in peripheral direction are arranged spaced from one another a distance 2T. The armature elements 9 are fashioned as C-cores 10, i.e., are laminated. The same is true for the armature elements of the inside stator 7, which are arranged radially inside the pole structure 12, as illustrated in FIG. 1. The armature elements 9 of the out-side stator are peripherally offset by the pole pitch T relative to the armature elements of the inside stator. The pole pitch T is given by the thickness of the permanent magnets 13 and of the soft iron elements 14 including each respective magnetically and electrically nonconductive insulating layer 15. Also the armature elements of the inside stator 7 are peripherally spaced by twice the pole pitch T, which with the smaller radius of the armature elements on the inside stator corresponds to a smaller absolute value of the spaces. Therefore, the annular winding 8 is favorably arranged on the outside stator 6, with the electrical lead 16 to this annular winding preferably being routed between the armature elements 9 in the radially outer area. In this way it is possible to design the machine with smaller values for the pole pitch T and, thereby, generate high power densities. Nonetheless, this measure avoids assembly difficulties, a complex winding structure for the inside stator and high thermal load.

I claim:

1. A current rectifier-excited synchronous electrical machine, comprising:
   a rotor defining an axis of rotation, said rotor including a rotor shaft, a stator housing, and a central disk, said rotor shaft mounted in said housing, said central disk extending radially outward from said rotor and defining an outer circumference,
   at least one ring-shaped pole structure secured to said disk outer circumference and disposed coaxial to said axis of rotation, said pole structure including a plurality of permanent magnets, soft iron elements and insulators, said permanent magnets and soft iron elements disposed in interleaved fashion, said insulators formed of magnetically and electrically nonconductive material and disposed between each of said magnets and iron elements, said magnets, iron elements and insulators disposed in two side-by-side rows;
   each said pole structure opposed by a stator assembly comprising an outside stator and an inside stator, said outside stator disposed radially outward of said pole structure, said inside stator disposed radially inward of said pole structure, said outside and inside stators comprising armature elements of a general U-shape defining a pair of ends disposed adjacent and facing said pole structure; and
   a single armature winding for operably exciting said stator, said armature winding disposed only in one of said outside stator and inside stator, the other of said outside and inside stator being void of an armature winding.

2. The electrical machine of claim 1, wherein said armature winding is disposed in said outside stator.

3. The electrical machine of claim 1, wherein said stator void of a winding is formed with laminated back circuit elements defining C-cores, said stator void of a winding disposed in a peripheral direction with a spacing corresponding to two times the pole pitch of the rotor.

4. The electrical machine of claim 1 wherein said stator having said armature winding disposed therein comprises a row of U-shaped C-cores, said C-cores extending in a peripheral direction and disposed around three sides of said armature winding.

5. The electrical machine of claim 1 comprising two pole structures and two stator assemblies, said outside stator and inside stator, and each of said stator assemblies including said armature winding, each said pole structure and stator assembly respectively disposed axially symmetrically on each side of said central disk, said armature disposed in either of said inside stator and outside stator.

* * * * *